219-121 SR

12/17/85 OR 4,559,439

United States Patent [19]

Camacho et al.

[11] Patent Number: 4,559,439

[45] Date of Patent: Dec. 17, 1985

[54] FIELD CONVERTIBLE PLASMA GENERATOR AND ITS METHOD OF OPERATION

[75] Inventors: Salvador L. Camacho; David P. Camacho, both of Raleigh, N.C.

[73] Assignee: Plasma Energy Corporation, Raleigh, N.C.

[21] Appl. No.: 557,217

[22] Filed: Dec. 2, 1983

Related U.S. Application Data

[63] Continuation-in-part of Ser. No. 460,062, Jan. 21, 1983.

[51] Int. Cl.[4] .................................................. B23K 9/00

[52] U.S. Cl. ...................... 219/121 PM; 219/121 PQ; 219/121 PR

[58] Field of Search ...... 219/121 P, 121 PM, 121 PQ, 219/121 PR, 121 PV, 121 PW, 124.02, 75, 76.16, 124.03, 76.14, 121 PY, 121 PN; 422/186.22

[56] References Cited

U.S. PATENT DOCUMENTS 3,194,941 7/1965 Baird ........................ 219/121 PN X
4,022,872 5/1977 Carson et al. .............. 422/186.22 X
4,125,754 11/1978 Wasserman et al. ........ 219/121 PM
4,142,090 2/1979 Essers et al. .................... 219/121 P
4,170,727 10/1979 Wilkins ............................ 219/121 P
4,194,106 3/1980 Rudaz et al. ................. 219/76.14 X
4,205,215 5/1980 Willems ........................... 219/121 P
4,370,538 1/1983 Browning ..................... 219/121 PY

*Primary Examiner*—C. L. Albritton
*Assistant Examiner*—M. M. Lateef
*Attorney, Agent, or Firm*—Bell, Seltzer, Park & Gibson

[57] ABSTRACT

A plasma arc torch is disclosed which has the ability to be configured for operation in either the transfer arc mode or the non-transfer arc mode. The torch includes a rear housing section which mounts a rear electrode, a gas vortex generator, and releasable mounting means. The releasable mounting means is adapted to mount either an electrode assembly for operation of the torch in the non-transfer arc mode, or a collimating nozzle assembly for operation in the transfer arc mode. The torch also includes a coolant passageway which is constructed and arranged so as to mate with cooperating passageways in either the electrode assembly or the collimating nozzle assembly, for removing heat from the internal components of the torch.

11 Claims, 6 Drawing Figures

FIELD CONVERTIBLE PLASMA GENERATOR AND ITS METHOD OF OPERATION

This application relates to U.S. pending application Ser. No. 06/460,062, filed Jan. 21, 1983, and is a continuation-in-part thereof.

FIELD OF THE INVENTION

This invention in general relates to plasma arc torches and to their method of operation. More particularly, the invention relates to plasma arc torch which can be selectively operated in the non-transferred or the transferred mode of operation by interchanging an electrode assembly and a collimating nozzle assembly. The electrode assembly is adapted to serve as the attachment point for the electrical arc in the non-transferred mode, and a collimating nozzle assembly is adapted to serve as a collimating nozzle for an electrical arc passing therethrough to an external attachment point in the transferred mode.

BACKGROUND OF THE INVENTION

Plasma arc torches are known in the prior art, and comprise a device which can efficiently convert electrical energy into heat energy. The torch generates a plasma flame using a relatively small gas flow. The heat from the plasma flame has advantages over the heat from a combustion flame, including high flame temperature, variable controlled atmospheres which are compatible with many chemical and metallurgical processes, and high thermal efficiencies. Normally, about 9 kilograms (at 20 pounds pressure) of air are required to release through the combustion flame the 11,000 kilocalories (44,000 BTUs) in one kilogram of fuel oil or one kilogram of natural gas. The torch plasma flame on the other hand requires less than 0.1 kilogram of air to release comparable heat levels. The high flame temperature, low gas requirement and high thermal efficiencies make the plasma arc torch ideally suited for various applications in the rapidly growing technologies such as aerospace, nuclear, and energy fields, and in the more conventional technologies such as waste disposal, steelmaking and refining, ozone generation, and the like.

The plasma arc generators or torches are commonly of two types. The first type utilizes the more conventional non-transferred arc mode of operation. The plasma generator or torch for operation in the non-transferred arc mode comprises a rear electrode, a front electrode, and a gas vortex generator which is coaxially aligned between the two electrodes. The entire assembly is, of course, contained within a suitable housing which may be water-cooled and has the necessary ancillary power components necessary for generating an electrical arc, which extends from the rear electrode, through the gas vortex generator, and to an attachment point on the front electrode. The second mode of operation is the so-called transferred arc type. In the transferred arc type of plasma generator, a collimating nozzle is mounted in coaxial alignment with the rear electrode and vortex generator. In this type of operation, the electrical arc attaches between the rear electrode and an external workpiece which is being worked upon, after passing through the collimating nozzle. Transferred arc generators are described, for example, in Baird, U.S. Pat. No. 3,194,941; and in Camacho, U.S. Pat. No. 3,818,174. The two modes of operation have advantages in their select areas of application.

In copending application Ser. No. 460,062 filed Jan. 21, 1983, various improvements are described in plasma arc torches, including a torch capable of being operated in the transferred arc mode as well as in the non-transferred arc mode, note the specification at pages 26–29, and FIGS. 71–77. The application also discloses at FIG. 72 an improved front electrode which can be assembled with the general assembly of the described torch. This torch has been referred to at times as a convertible torch. The present application is concerned with a convertible torch of the type defined in application Ser. No. 460,062.

OBJECTS AND GENERAL DESCRIPTION OF THE PRESENT INVENTION

A primary object of the present invention is to provide a plasma arc torch which can be readily converted from the transferred mode of operation to the non-transferred mode of operation, in the field, i.e., at the place the torch is in use.

This and other objects of the invention will be more fully apparent from the following detailed description of preferred embodiments of the invention.

The aforesaid objects of this invention are accomplished by constructing a plasma torch with the torch comprising an outer housing fabricated in sections. Within the housing, there is mounted in order, a rear electrode connected with a suitable electric power supply, a gas vortex generator and, depending on the mode of operation, either an electrode assembly for operating in the non-transferred arc mode, or a collimating nozzle assembly for operating in the transferred arc mode. Water coolant and gas supply lines are suitably contained in the housing. The rear housing section includes mounting means for releasably engaging either the electrode assembly for operation in the non-transfer mode, or the collimating assembly for operation of the torch in the transferred mode. When, for example, it is desired to convert from the transferred mode to the non-transferred mode, the collimator assembly is removed and replaced with the electrode assembly, which includes a front housing section. One end of the front housing section is mated for releasable engagement to the remaining portion of the electrode assembly, and its other end mates with the rear housing section. The collimating assembly, the front electrode assembly, and front housing section are designed to provide coolant passages for cooling the various components of the torch, regardless of whether the front electrode assembly or collimating nozzle assembly is being utilized.

Having described the invention in general terms, a specific embodiment will be described with reference to the accompanying drawings, in which FIG. 1*a* is a perspective view of a plasma arc torch which embodies the features of the present invention, and which is configured to operate in the non-transferred arc mode;

FIG. 1*b* is an enlarged sectional view of the torch of FIG. 1*a;*

Figure 1A:
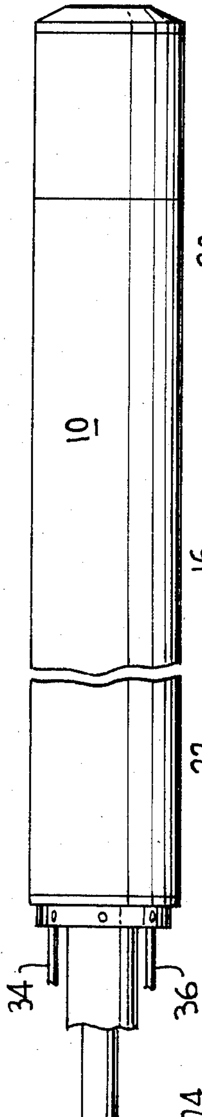
Figure 1B:
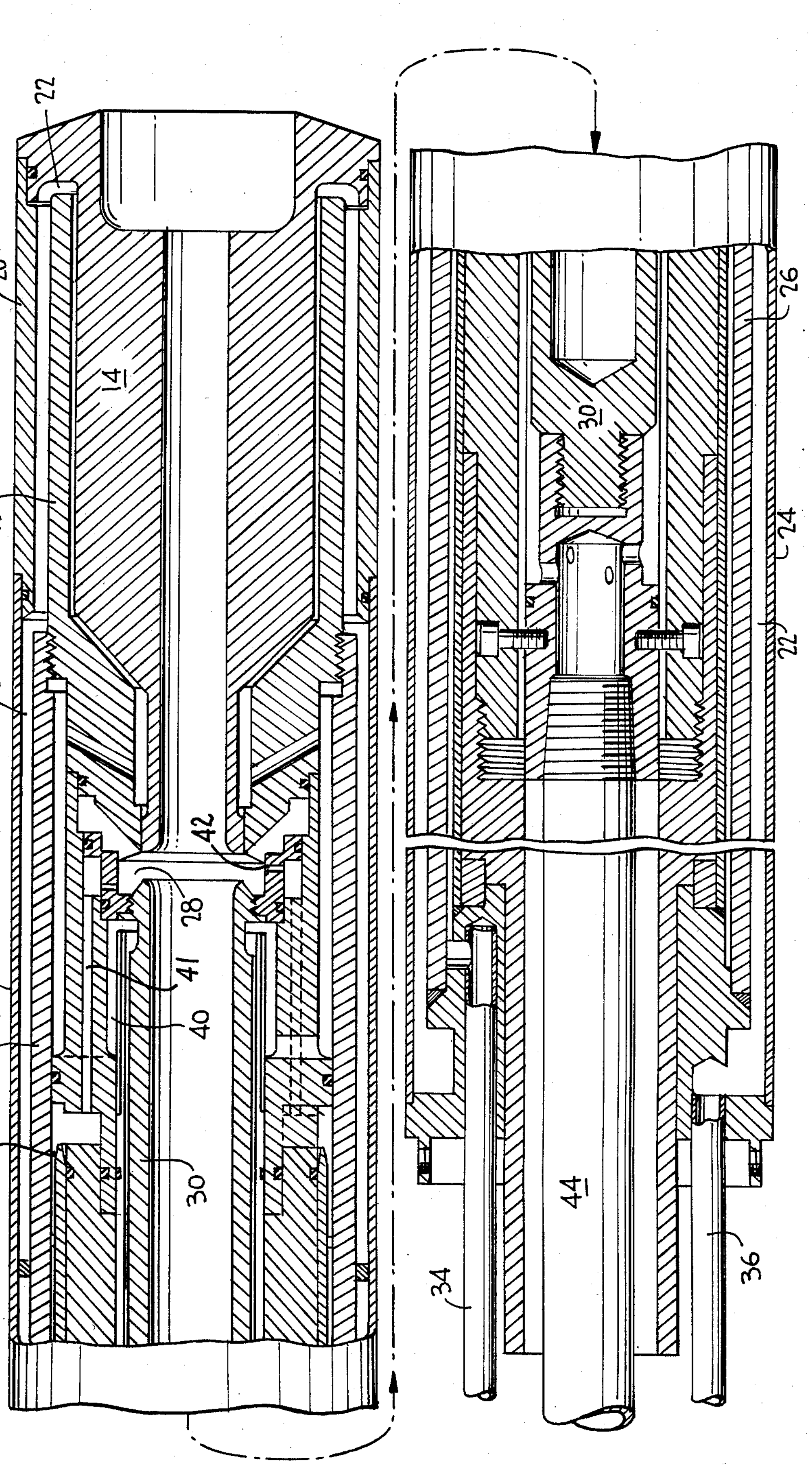
Figure 4:
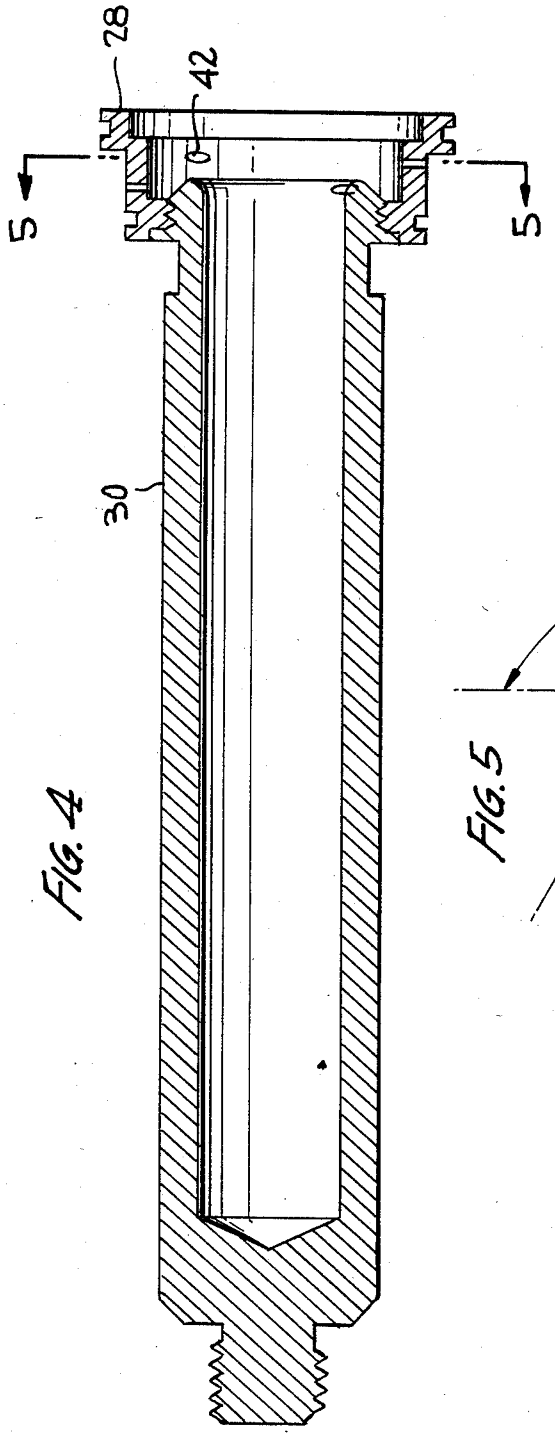
FIG. 4 is a sectional view of the rear electrode and gas vortex generator, which are threadedly interconnected.
Figure 5:
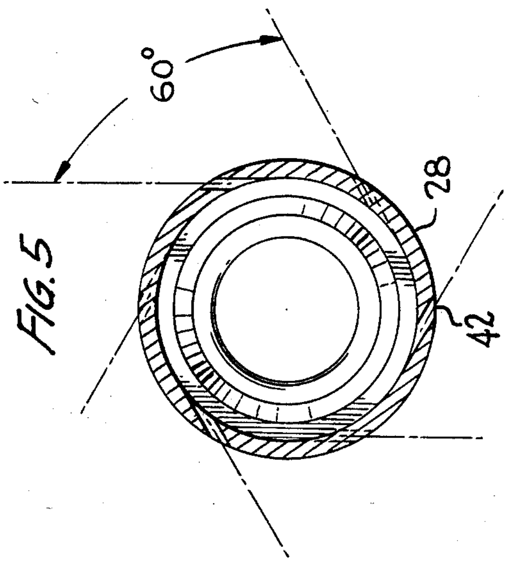
FIG. 5 is a sectional view through line 5—5 of the vortex generator, showing the angles of the gas openings in the generator.

Referring first to FIGS. 1*a* and 1*b*, a plasma arc torch 10 is illustrated which embodies the features of the present invention, and which is configured for operation in the non-transferred arc mode. The torch comprises a tubular rear housing section 24, and a cylindrical rear electrode 30 mounted coaxially within the rear housing section 24. The electrode 30 comprises a tubular metal member having a closed inner end and an open outer end. An annular gas vortex generator 28 is threadedly mounted to the outer end of the electrode 30 (note FIG. 4), and thus the generator is also mounted within the rear housing section 24. The vortex generator 28 includes a plurality of tangentially directed openings 42 (note FIG. 5), and it is adapted to receive pressurized gas via a gas delivery passageway 41 which extends through the torch and which includes the gas delivery tube 34. Upon passing inwardly through the openings of the generator, a vortical flow of gas is generated by reason of the tangential orientation of the openings, and which is in coaxial alignment with the rear electrode 30.

The rear housing section 24 also coaxially mounts a tubular sleeve 26 therewithin, and the sleeve 26 includes an internally threaded forward end. As will become apparent, this threaded forward end serves as a releasable mounting means for selectively mounting either the electrode assembly 12 or the collimating nozzle assembly 31.

Figure 2:
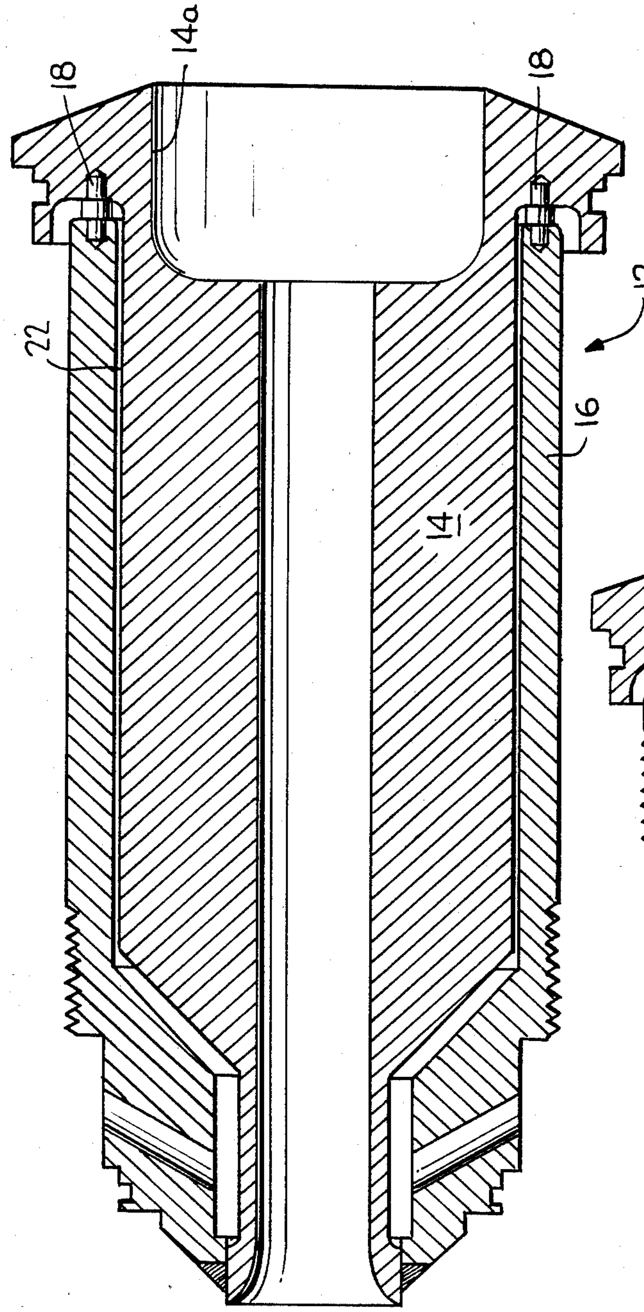
FIG. 2 is a sectional view of a portion of the electrode assembly, including the front electrode and mating outer sleeve.

As configured in FIGS. 1*a* and 1*b*, the torch 10 mounts the electrode assembly 12, which includes a tubular metal front electrode 14 having a bore extending therethrough, and an outer sleeve 16 which is fixed to the front electrode by welding or the like at the left end as seen in FIG. 2. The sleeve 16 extends axially along at least the majority of the axial length of the front electrode 14 in a slightly spaced apart arrangement to define a gap 22 therebetween. The electrode assembly further comprises external threads mounted on the sleeve 16 which are adapted to releasably engage the internal threads on the sleeve 26, to thereby releasably mount the electrode assembly to the rear housing section in the operative position shown in FIGS. 1*a* and 1*b*. In particular, the front electrode 14 is in coaxial alignment with the rear electrode 30 and the vortex generator 28, and such that the bore of the front electrode 14 is adapted to serve as an attachment point for an electrical arc extending from the rear electrode 30 and through the vortex generator 28 to the bore of the front electrode 14. The electrode assembly further includes a forward tubular housing section 20 which is adapted to coaxially mate with the rear housing section and with a flange on the forward end of the electrode 14 in the operative position of the electrode assembly.

Figure 3:
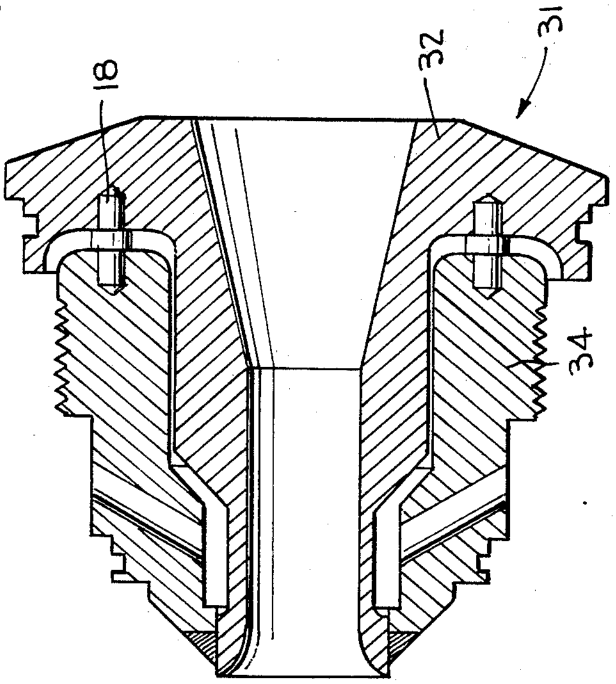
FIG. 3 is a sectional view of the collimating nozzle assembly, including the collimator and mating outer sleeve.

The torch 10 further comprises a collimating nozzle assembly 31 as best seen in FIG. 3, and which comprises a tubular nozzle 32 having a bore therethrough, and an outer sleeve 34 which is fixed to the nozzle by welding or the like at the left end as seen in FIG. 3, and by the pins 18 at the other end. The sleeve 34 extends axially along at least the majority of the axial length of the nozzle 32 in a slightly spaced apart arrangement to define a gap therebetween. The outer sleeve 34 includes an external thread which is adapted to releasably engage the threads of the sleeve 26 for releasably mounting the collimating nozzle assembly to the rear housing section when the electrode assembly 12 is removed. In its operative position, the collimating nozzle assembly is in coaxial alignment with the rear electrode and the vortex generator, and such that the collimating nozzle assembly is adapted to serve as a collimating nozzle for an electrical arc extending from the rear electrode 30, through the vortex generator 28, and also through the bore of the nozzle 32 to an external attachment point.

From the above description, it will be seen that either the electrode assembly 12 or the collimating nozzle assembly 31 may be mounted by means of the threaded interconnection between the sleeve 26 and the outer sleeve of the respective assembly, so that the torch may operate in a non-transfer arc mode when the electrode assembly is mounted to the rear housing section, or in the transfer arc mode when the collimating nozzle assembly is mounted to the rear housing section. The torch of the present invention further comprises coolant passageway means for directing a cooling fluid, preferably water, along each of the rear electrode and the front electrode to remove heat therefrom. As illustrated, this coolant passageway includes the water inlet tube 44 by which the water is directed along the external surface of the rear electrode 30 along the passageway 40, and then along the gap 22 formed between the front electrode 14 and the outer sleeve 16. The fluid then passes rearwardly to the outlet tube 36. The inlet tube 44 is preferably metal, and serves to conduct the necessary electrical power to the rear electrode 30. When the collimating nozzle assembly is assembled with the rear housing section, the cooling fluid will pass through the gap between the nozzle 32 and outer sleeve 14 in a similar manner.

The front bore of the front electrode 14 may include an enlarged cup-shaped forward end portion 14*a* as best seen in FIG. 2. It has been found that the cup-shaped forward end portion is desirable, in that by proper coordination of the power level and the volume of the gas entering the vortex generator, the arc extending from the rear electrode 30 may be made to attach to the forwardly facing shoulder of the enlarged bore portion 14*a*. As a result, the erosion caused by the attachment point extends axially to the left as seen in FIG. 2, as opposed to extending radially through the wall of the electrode. As a result, the useful life of the electrode may be significantly extended. It will also be seen from the drawings that the electrode assembly 12 has an axial length substantially greater than that of the collimating nozzle assembly 31, which accounts for the use of the tubular forward housing section 20 with the electrode assembly but not with the collimating nozzle assembly.

The torch of the present invention may be sized for various power requirements. For example, the torch of the present invention may typically have a power capacity of between 60 kilowatts to 150 kilowatts.

In the drawings and specification, there has been set forth a preferred embodiment of the invention, and although specific terms are employed, they are used in a generic and descriptive sense only, and not for purposes of limitation.

That which is claimed is:

1. A plasma arc torch characterized by the ability to be configured for operation in the transfer arc mode or the non-transfer arc mode, and comprising a tubular rear housing section, a cylindrical rear electrode mounted coaxially to said rear housing section and comprising a tubular metal member having a closed inner end and an open outer end, annular vortex generating means mounted coaxially to said rear housing section and adjacent said outer end of said rear electrode for generating a vortical flow of a gas, releasable mounting means fixedly mounted to said rear housing section, an electrode assembly having a tubular bore therethrough and including means for releasably engaging said mounting means to releasably mount said electrode assembly to said rear housing section in an operative position in coaxial alignment with said rear electrode and said vortex generating means, and such that the bore of said electrode assembly is adapted to serve as an attachment point for an electrical arc extending from said rear electrode and through said vortex generating means to said bore, and a collimating nozzle assembly having a tubular bore therethrough and including means for releasably engaging said mounting means to releasably mount said collimating nozzle assembly to said rear housing section in an operative position in coaxial alignment with said rear electrode and said vortex generating means, and such that said collimating nozzle assembly is adapted to serve as a collimating nozzle for an electrical arc extending from said rear electrode and through said vortex generating means and through said bore of said collimating nozzle assembly to an external attachment point, and whereby either said electrode assembly or said collimating nozzle assembly may be mounted by means of said mounting means to said rear housing section so that the torch may operate in a non-transfer arc mode when the electrode assembly is mounted to said rear housing section or in the transfer arc mode when said collimating nozzle assembly is mounted to said rear housing section.

2. The plasma arc torch as defined in claim 1 wherein said electrode assembly comprises a tubular metal front electrode defining said bore, and an outer sleeve fixed to said front electrode and extending axially along at least the majority of the axial length thereof in a slightly spaced apart arrangement.

3. The plasma arc torch as defined in claim 2 wherein said electrode assembly further comprises a forward tubular housing section adapted to coaxially mate with said rear housing section in said operative position of said electrode assembly.

4. The plasma arc torch as defined in claim 3 wherein said bore of said front electrode has an enlarged cup-shaped forward end portion.

5. The plasma arc torch as defined in claim 2 wherein said releasable mounting means comprises a tubular member having a threaded end portion, and said means for releasably mounting said electrode assembly to said rear housing section comprising a mating thread formed on said outer sleeve.

6. The plasma arc torch as defined in claim 1 wherein said collimating nozzle assembly comprises a tubular nozzle defining said bore, and an outer sleeve fixed to said nozzle and extending axially along at least the majority of the axial length thereof in a slightly spaced apart arrangement.

7. The plasma arc torch as defined in claim 6 wherein said releasable mounting means comprises a tubular member having a threaded end portion, and said means for releasably mounting said collimating nozzle means comprising a mating thread formed on said outer sleeve.

8. The plasma arc torch as defined in claim 1 wherein said electrode assembly has an axial length substantially greater than the axial length of said collimating nozzle assembly.

9. The plasma arc torch as defined in claim 1 wherein said rear housing section further comprises gas passageway means for delivering a pressurized gas to said vortex generating means.

10. The plasma arc torch as defined in claim 1 wherein said rear housing section further comprises coolant passageway means, and each of said electrode assembly and said collimating nozzle assembly include coolant passageway means which are constructed and arranged to communicate with the coolant passageway means of said rear housing section when the respective assembly is assembled thereto.

11. The plasma arc torch as defined in claim 1 wherein said electrode assembly comprises a tubular metal front electrode defining said bore thereof, and an outer sleeve fixed to said front electrode and extending axially along at least the majority of the axial length thereof in a slightly spaced apart arrangement, and wherein said collimating nozzle assembly comprises a tubular nozzle defining said bore thereof, and an outer sleeve fixed to said nozzle and extending axially along at least the majority of the axial length thereof in a slightly spaced apart arrangement, and wherein said rear housing section further comprises coolant passageway means, and each of said electrode assembly and said collimating nozzle assembly includes coolant passageway means which are constructed and arranged to communicate with the coolant passageway means of said rear housing section when the respective assembly is assembled thereto, and such that a coolant is adapted to flow axially along the space between said front electrode and sleeve when said electrode assembly is assembled to said rear housing section, or axially along the space between said nozzle and sleeve when said collimating nozzle assembly is assembled to said rear housing section.

* * * * *